US012313419B2

(12) United States Patent
Khemiri

(10) Patent No.: US 12,313,419 B2
(45) Date of Patent: May 27, 2025

(54) USE OF PREDEFINED (PRE-BUILT) GRAPHICAL REPRESENTATIONS OF ROADS FOR AUTONOMOUS DRIVING OF VEHICLES AND DISPLAY OF ROUTE PLANNING

(71) Applicant: Nizar Khemiri, Bristol (GB)

(72) Inventor: Nizar Khemiri, Bristol (GB)

(73) Assignee: Nizar Khemiri, Bristol (GB)

( * ) Notice: Subject to any disclaimer, the term of this patent is extended or adjusted under 35 U.S.C. 154(b) by 376 days.

(21) Appl. No.: 17/712,079

(22) Filed: Apr. 2, 2022

(65) Prior Publication Data

US 2022/0390252 A1    Dec. 8, 2022

(51) Int. Cl.
*G01C 21/36*    (2006.01)
*B60W 60/00*    (2020.01)
*G01C 21/00*    (2006.01)

(52) U.S. Cl.
CPC ..... *G01C 21/3647* (2013.01); *G01C 21/3896* (2020.08); *B60W 60/001* (2020.02); *B60W 2420/403* (2013.01); *B60W 2552/05* (2020.02); *B60W 2552/53* (2020.02); *B60W 2554/4041* (2020.02); *B60W 2554/804* (2020.02); *B60W 2555/60* (2020.02); *B60W 2556/45* (2020.02)

(58) Field of Classification Search
None
See application file for complete search history.

(56) References Cited

U.S. PATENT DOCUMENTS

| | | | | |
|---|---|---|---|---|
| 10,488,215 B1 * | 11/2019 | Yu | ......... | G01C 21/365 |
| 2008/0195315 A1 * | 8/2008 | Hu | ......... | G08G 1/0969 |
| | | | | 701/455 |
| 2010/0168997 A1 * | 7/2010 | Sakamoto | ............. | G09B 29/10 |
| | | | | 345/619 |
| 2014/0139674 A1 * | 5/2014 | Aoki | ......... | G06T 7/85 |
| | | | | 348/148 |
| 2018/0074506 A1 * | 3/2018 | Branson | ............... | G06N 3/04 |

* cited by examiner

*Primary Examiner* — Todd Melton
*Assistant Examiner* — Jason R Roberson

(57) ABSTRACT

The use of predefined (pre-built) graphical representations of roads for autonomous driving of vehicles and display of route planning.
The present invention relates to a method for autonomous vehicle driving and route planning by using 360-degree pre-defined graphical representations of roads. This method creates and uses a dataset that combines a graphical representation of roads with real-time visual data captured by cameras mounted on a vehicle. The pre-defined 360-degree graphical representation which depicts the visual scene from the perspective of a vehicle on the road observed in all directions during a full 360-degree rotation at known GPS locations is stored in a cloud-based facility for access.
Key elements include video cameras for real-time capture, a module for accessing a predefined graphical dataset, a GPS-based positioning module, and a system for continuously aligning the graphical display with the real-time camera feed. This method integrates predefined graphical data with real-time inputs.

13 Claims, 5 Drawing Sheets

USE OF PREDEFINED (PRE-BUILT) GRAPHICAL REPRESENTATIONS OF ROADS FOR AUTONOMOUS DRIVING OF VEHICLES AND DISPLAY OF ROUTE PLANNING

BACKGROUND OF THE INVENTION

The present invention relates to a method of generating and using a new data set that can be applied to develop a novel technique of autonomous vehicle driving and route planning display. The generation of the new dataset uses a predefined and simplified graphical representation of roads and their surroundings in conjunction with the actual view seen by cameras and other sensors mounted on a vehicle, and the GPS location of the vehicle.

At present, the vehicle's autopilot system uses video cameras, ultrasonic sensors and radar to see and detect road limits, traffic lanes, traffic signs and to detect in real time the environment around vehicles. While the existing vehicle's autopilot provides driving autonomy, it is important to continue to develop autonomous driving capabilities based on new methodologies and techniques. In addition, a new autonomous driving methodology is advantageous in that it will improve the safety of the autopilot by providing an additional layer of protection. The present invention provides a different methodology for using real-time information about the environment of a given vehicle traveling on the road to supports vehicle autonomous driving and route planning display.

The present invention provides a different methodology to collect and represent in real time the environment and surroundings of a given vehicle traveling on the road, and to generate a new data set that can be used for autonomous driving.

The present disclosure consists of the use of a predefined and simplified graphic representation of the visual scene experienced from vehicles on roads, in conjunction with the actual visualization filmed by video cameras mounted at various locations around the vehicle. Radars and ultrasonic sensors can further be used to identify other vehicles and objects on the road and display them on the predefined graphic representation of the actual view seen from the given vehicle.

An important aspect of the present invention is that it is also used to provide a wider scope, such as to display road information and traffic signs above the predefined graphic illustration of the real view filmed by a camera mounted at a given location in the vehicle. It is also possible to display the route planning (overlay) in addition to the data extracted from the predefined database of the actual view filmed by the camera mounted for example on the vehicle's dashboard.

BRIEF SUMMARY OF THE INVENTION

According to one embodiment, there is provided a method for vehicle autonomous driving for use with a vehicle having one or more vehicle cameras and one or more vehicle sensors, may comprise a predefined and simplified graphic representation/illustration of the visual scene of a vehicle at the GPS locations on the road.

The predefined graphic visualization/illustration is prepared in advance using a specially equipped vehicle with cameras and adapted to travel and capture the visual scene from different angles and positions on the road. A computer-implemented method using computer graphics technology converts the visual scene into a simple graphic representation of the filmed visual scene.

The predefined graphic representation of the visual scene only shows a simplified graphical representation of roads and some environments. It can include road limits, road lanes, road markings, and traffic signs.

The predefined graphic representation of the visual scene consists of simple graphical representations of road boundaries, road lanes, and other road information in empty space or empty background The predefined graphic representation corresponds to a graphic representation of the visual scene linked to a GPS location on the road.

The predefined graphical representation covers different viewing angles from known GPS positions on the road. According to one embodiment, it covers a 360 degree view anywhere on the road and at different heights from road surfaces. The predefined database is a 360 degree reconstruction, using a simple graphical representation, of the view on the road.

The predefined graphic visualization/illustration is stored in a cloud-based facility and can be updated as needed to capture any changes made to roads during road works, such as changes to road markings, add new traffic lights and new junctions.

In accordance with one embodiment, the present method can comprise a GPS tool identifying the location of the vehicle; a communication unit connected to the predefined and simplified graphic visualization/illustration database According to various embodiments, the method further comprises a receiving step which receives continuously the predefined graphic visualization/illustration at the corresponding GPS location of the vehicle on the road.

According to various embodiments, a vehicle can include a video data collection step that gathers vehicle video footage data from digital image capturing devices mounted on the vehicle and adapted to capture the visual scene at different viewing angle from the vehicle.

According to various embodiments, a computerized method implemented can comprise: the processing of the video data to identify reference features on the road, such as and not limited to road marking, road boundaries . . . ; pre-scan the reference features represented in the visual scene and adjust the viewing angle and position in the predefined graphic visualization data to match the reference features and determine the exact position and orientation of the vehicle on the road in the predefined database.

A sensor data collection step that collects vehicle sensor data in the form of the relative position to the vehicle of other vehicles and objects on the road.

According to various embodiments, a computer method may include: processing sensor data, relating to the relative position of other vehicles and objects on the road, to identify the location of other vehicles and objects in the predefined graphic representation of roads seen from the GPS location of the vehicle.

In various embodiments, a computerized method implemented can include identifying the action list for the vehicle's autopilot system.

In some embodiments, the real-time adjusted forward looking view, at the vehicle GPS location on the road, is extracted from the predefined graphic database and displayed on a device mounted in the vehicle.

In some embodiments, the vehicle travel route planning can be displayed on top of the display of the adjusted predefined graphic visualization scene. The travel instructions based on the travel route may include presenting a graphic representation of the travel route appended to the predefined graphic illustration.

BRIEF DESCRIPTION OF THE SEVERAL VIEWS OF THE DRAWING

The present disclosure is hereinafter described in detail in connection with the accompanying figures. The figures are used by way of illustration only and provide exemplary embodiments.

DETAILED DESCRIPTION OF THE INVENTION

The method described herein is designed to support developing a new technique for vehicle autonomous driving and route planning display, based on the use of the pre-defined and simplified graphic illustrations of the roads and their surroundings, in conjunction with the real-time location of the vehicle and vehicle external data, which is collected using vehicle mounted sensors.

In accordance with various embodiments, the pre-defined simplified graphic representation is prepared in advance from the collection and processing of visual data at various locations on the roads. Visual data corresponds to the 360 degree landscape as experienced from any possible location of a vehicle on the road. The predefined and simplified graphic database is called later to identify the precise location and direction of a given vehicle in the predefined database and to be used as part of a new autonomous driving method.

The 360 degree graphic and simplified representation of the visual seen from a vehicle is prepared in advance using a specially equipped vehicle with cameras to film the view in the road at 360 degree angle and different position on the road and height from the surface of the road. The filmed visual scene is processed and simplified to keep only a simplified graphic geometric representation of: the road boundaries, road limits, road lanes, road marking and a geometric illustration of some standard features like bridges and roundabout, in an empty background. The simplified 360 degree graphic representation is stored in a cloud-based database. Each location on the simplified 360 degree graphic representation is linked to a GPS coordinate and precise location on the road.

Figure 1:
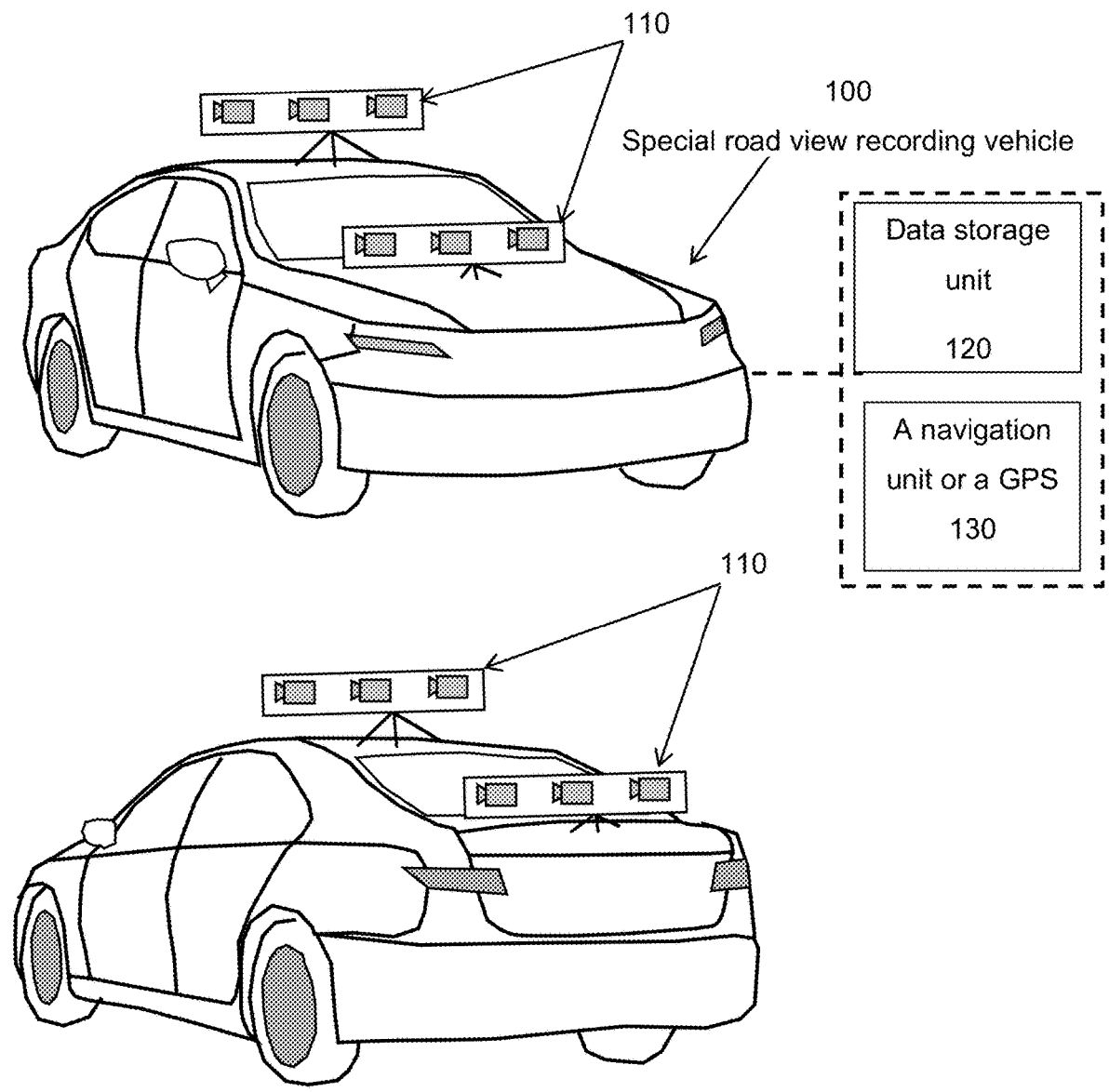
FIG. 1 is an illustration of the special vehicle equipped with cameras and a storage unit, which is used to record the data required for the definition of the pre-defined 360 degree graphic illustration of the view of roads as experienced from vehicles on roads

In FIG. 1, there is shown an example of a special road view recording vehicle 100 equipped with video cameras 110, a data storage unit 120 and a navigation unit or a GPS 130. The special vehicle 100 is used to collect the necessary information for the preparation of the simple and pre-defined graphic representation of the visual scenes experienced from vehicles on roads. The vehicle 100 drives on the roads to film the visual scene captured by these video cameras 110 and to store the corresponding data in the data storage unit 120. The cameras 110 are pointed in different directions and mounted at different heights from the road surface. The objective is to collect 360 degree views at different heights and be able to reconstruct the 360 degree view at any other possible height.

The data storage unit 120 is used to collect and store the information recorded by the cameras mounted on the special vehicle 100. A navigation unit or a GPS 130 continuously establishes the geographical location of the vehicle and links it to the data recorded by the video cameras 110 to associate a GPS position with the recorded video views.

Figure 2:
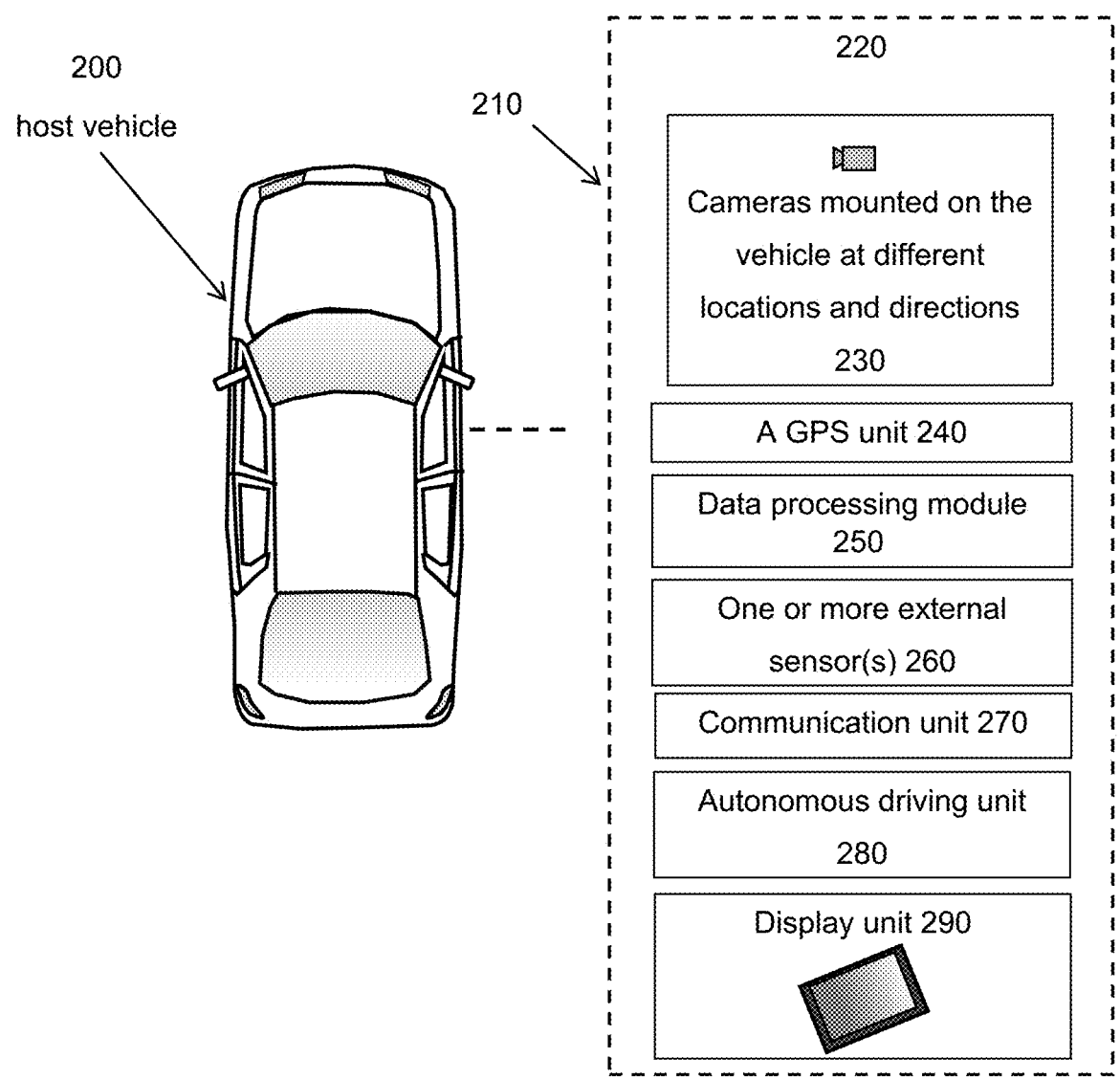
FIG. 2 illustrates a vehicle equipped with the instruments required to operate the method in this disclosure.

FIG. 2 shows an example of a host vehicle 200 having a device 210 including an autonomous driving unit and a route planning display. In this example, the vehicle device 210 is equipped with a hardware component 220 which includes multiple cameras 230, a GPS unit 240, a data processing module 250, one or more external sensor (s) 260, a communication unit 270, an autonomous vehicle driving unit 280, a display unit 290, other suitable electronic components as well as any other hardware, software, etc. which are needed to implement the method described herein. The vehicle hardware 220 arrangement of FIG. 2 is for illustration only.

Vehicle video cameras 230 are mounted on vehicle 200, at different locations and pointed in different directions for 360 degree visual coverage of the surrounding vehicle scene. One of the cameras faces forward to capture the visual scene in front of the vehicle.

External sensors 260 located around the vehicle may include, but are not limited to, a radar unit and/or an ultrasound unit. The external vehicle sensor provides information to system 210 regarding the relative position of objects and/or vehicles on the road from vehicle 200.

The autonomous vehicle driving module 280 provides the vehicle with autonomous driving capabilities. Module 280 includes a component for communicating with system 250 to collect the exact and corresponding location of vehicle 200 in the 360 degree graphic database, and a route planning software for calculating a travel route. The predefined graphical representation of the view recorded by the forward-facing camera of cameras 220, which is retrieved from the predefined database, can be viewed using display unit 290.

Figure 3:
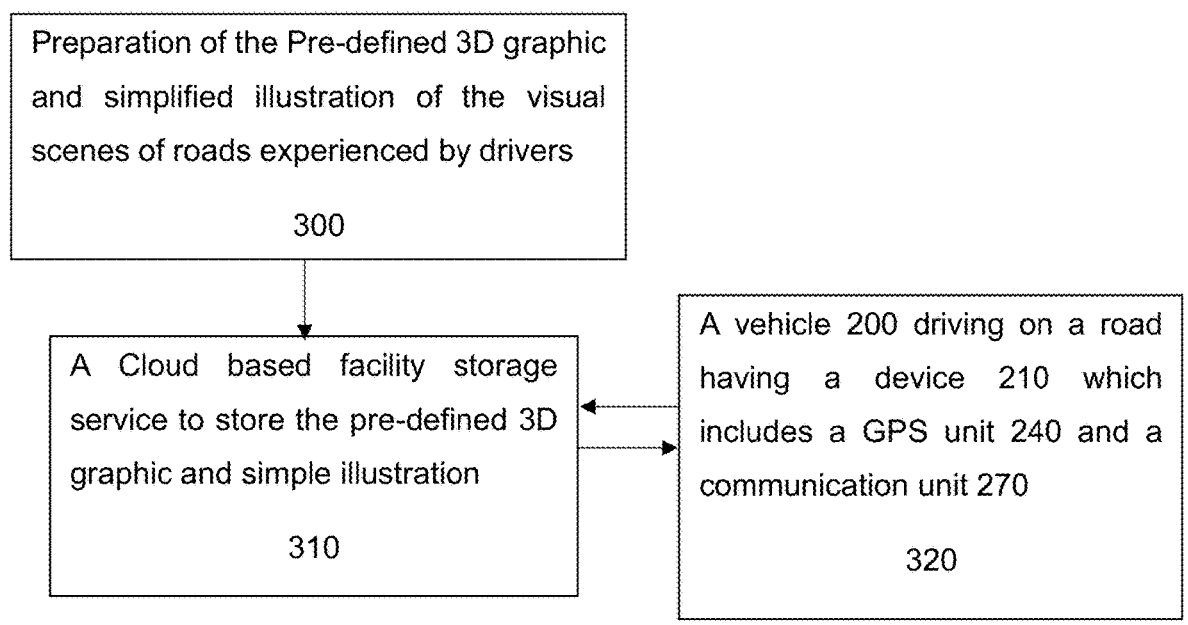
FIG. 3 Is a flowchart depicting the steps for the embodiment of this disclosure

FIG. 3 shows a flowchart which illustrates the different stages of implementation of this method from the generation and storage of the predefined 360 degree graphic view of the visual scene experienced from vehicles on roads, to the operations that can be carried out according to various embodiments to generate data set for autonomous driving and display of route planning. From step 300 where a database is once created and is available in a cloud-based system 310 and accessible from any vehicle 200 equipped with instruments 210, 220, 230, 240, 250, 260, 280 and 290. The geolocation of the vehicle 200 is tracked and used to identify in real time the location of the vehicle 200 in the cloud-based database 310, which consists of a 360 degree simplified graphic representation. Step 320 may use multiple video cameras 230 mounted on the vehicle 200, located around the vehicle 200 and facing different directions, including the forward direction looking at an area in front of the vehicle 200. The video data of the vehicle are collected and provided in any data format to the data processing module 250 and/or some other components. The data recorded by the vehicle's cameras is used by a data processing module 250, and/or another component, to refine the location of the vehicle in the 360 degree database by identifying road features, such as road boundaries and road markings, and continuously match the exact location and direction of the vehicle in the pre-defined 360 degree database. Step 320 uses vehicle sensors consisting of radar and/or an ultrasound-based system 260 to collect external data from the vehicle and provide it to the vehicle data processing module and/or some other components 250. Vehicle sensors identify vehicles and objects around vehicle 200 and their distance and relative location from vehicle 200. Vehicle sensor data is processed by a data processing module 250 to identify the exact location of the surrounding vehicles and objects in the predefined 360 degree database 310. The processed data, consisting of the exact location of the vehicle 200 on the predefined 360 degree database and the location of the external objects and other vehicles on the road is communicated to an autonomous driving unit 280 to translate this information into a driving action or function, without driver request, to support autonomous driving.

Figure 4:
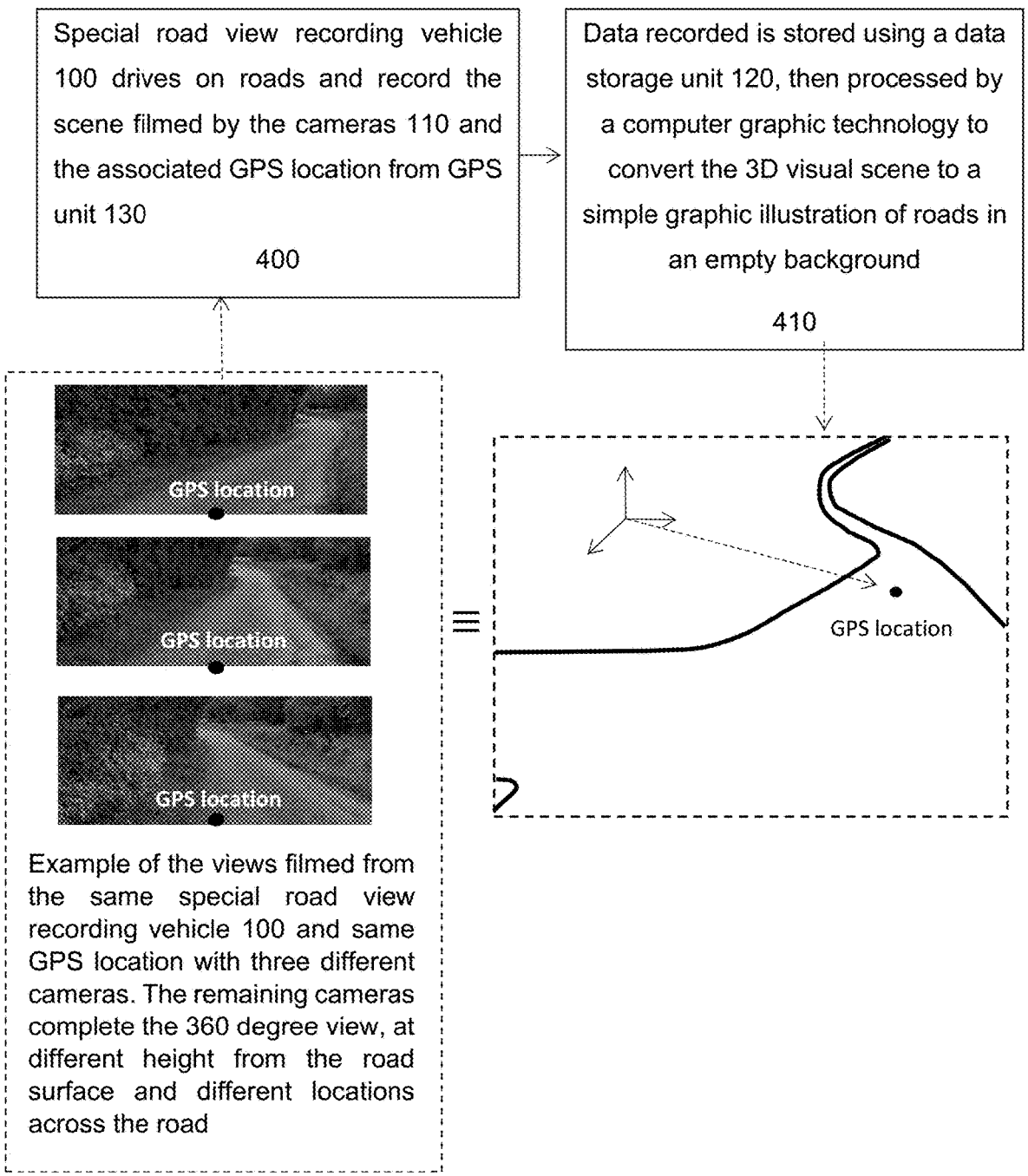
FIG. 4 is an illustrative example of the 360 degree database generation steps at a GPS location on a road.

FIG. 4 illustrates the operations, stage 400 and stage 410, that can be performed according to various embodiments to generate the predefined 360 degree graphic illustration of the visual data recorded by the different cameras cited in FIG. 1. The video cameras 110 are mounted on the vehicle 100 at different height from the road surface and located around the vehicle and facing different directions, including the forward direction. The video cameras 110 are intended to collect video images at 360 degrees and at different heights of the environment around the vehicle 100. The data obtained from the recording, stage 400, using the special vehicle 100 is converted in stage 410 into a simplified graphic illustration of the recorded view using computer graphics technology. The predefined and simplified 360 degree graphic illustration includes simple drawings of the road, road limits, road marking, traffic lanes and specific features such as roundabouts and bridges. As shown in FIG. 4, geometric lines are used in an empty background to represent the characteristics of the road. Objects on the road and its surrounding are not represented in the simplified 360 degree graphic definition. Only the continuous representation of roads and special traffic elements such as road marking, bridges, traffic signs and traffic lights are displayed. FIG. 4 also shows, by way of illustration only, the view at a given GPS position which can be filmed by the cameras mounted on the vehicle 100, facing forward, positioned at the same height from the road surface, but at different locations relative to the transverse direction of the road or width of the road. The views recorded by the other cameras of cameras 110 of the vehicle 100 are not shown in FIG. 4. The processing of data from video cameras 110 and GPS 130 and covering a large network of roads, using computer graphics technology, generates a 360 degree simplified graphic illustration of the road as shown as an example in FIG. 4. The predefined 360 degree representation of the road network is stored in a cloud-based database.

Figure 5:
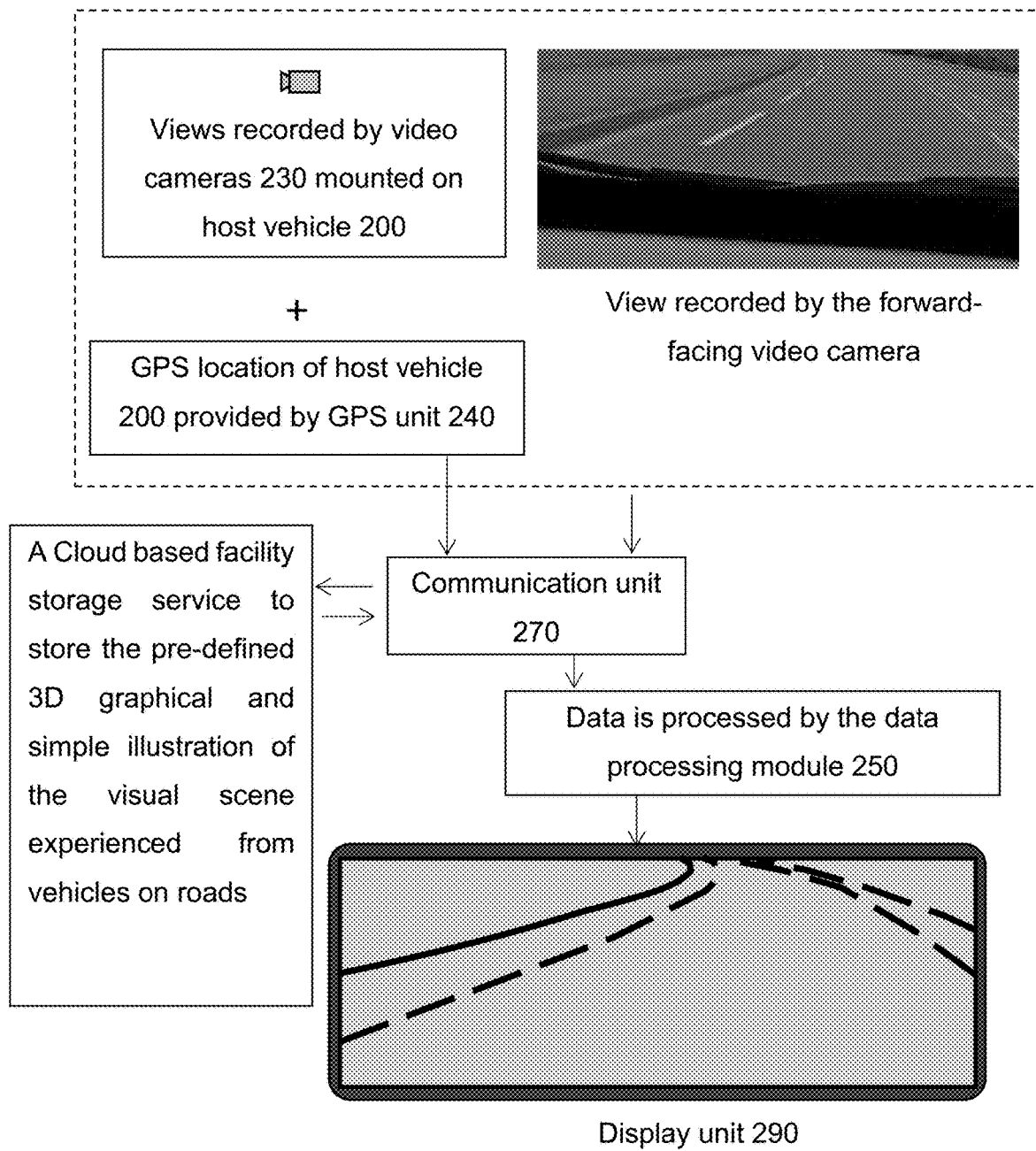
FIG. 5 is an illustrative example of the view filmed by a forward-facing camera on a given vehicle and the data extracted from the predefined 360 degree graphic database at the vehicle's GPS location corresponding to the view filmed by the camera facing forward.

In FIG. 5, the data collected by the video camera 230 and the GPS location from the GPS unit 240 are provided in any data format to the vehicle data processing module and/or some other system components 250. The GPS location of the vehicle 200 is also provided continuously to the communication unit 270, which then connects to the predefined cloud-based 360 degree database to extract the graphic and simplified representation of the road view at that location. All the information collected by components 230, 240 and 270 are used by the data processing module and/or some other system components 250 to identify reference features, such as, but not limited to, road boundaries, road markings and road lanes and to continuously identify the exact position and direction of the vehicle 200 in the 360 degree pre-defined graphics database that matches the exact and actual location and direction of the vehicle on the road captured by video cameras 230. The component 250 can correlate the images from the camera to the exact location of the vehicle in the predefined graphic representation database.

Also in FIG. 5 there is shown an illustration of how the information extracted from the pre-defined 360 degree graphic database is matched by component 250 with the actual view filmed by the forward-facing camera of cameras 230. The display device 290 can provide in real-time the view extracted from the pre-defined database, that correlates to and matches the view recorded by the forwarding facing camera.

The term vehicle designates a road transport machine such as a car.

The term host vehicle is used to refer to any vehicle on the road that is enabled to use the present invention for autonomous driving of vehicles and display of route planning.

The term special road view recording vehicle is used to refer to a vehicle specially equipped with the appropriate cameras, instruments and programming software to record continuously the vehicle surrounding view while the vehicle is travelling.

The invention claimed is:

1. A method for facilitating an autonomous driving of a host vehicle, comprising the steps of:

generating a data set by collecting and processing data from several cameras, one or more vehicle sensors, and a communication interface on a road view recording vehicle, wherein the data set pertains to a visual information of a surrounding environment of the road view recording vehicle;

creating a 360-degree database based on the generated data set, the 360-degree database comprising 3D graphical representation of a visual road scene, which is stored in a cloud-based facility, and represents a road network as experienced from the road view recording vehicle, including road features, wherein the 360-degree graphical representation is generated using a processing algorithm that extracts and prioritizes the road features;

equipping a host vehicle with an integrated system of cameras, sensors, and a communication interface, wherein the cameras and sensors are configured and calibrated to capture real-time data related to the host vehicle's surroundings and movement on the road;

establishing a continuous connection between the host vehicle's communications interface and a cloud-based facility that stores the 360-degree database, enabling real-time access to the 360-degree graphical representation of the visual road scene, as experienced by the road view recording vehicle on the roads;

generating a real-time data set by collecting real-time data from the host vehicle's cameras and sensors, and processing that data through an onboard computing system to determine the host vehicle's current position, direction of the host vehicle, and trajectory on the road;

accessing and retrieving the 360-degree graphical representation corresponding to the visual road scene at the location of the host vehicle, the 360-degree graphical representation being retrieved from the cloud-based facility based on the host vehicle's current GPS position and orientation, as determined by the sensors and the cameras integrated with the host vehicle;

adjusting a viewing angle and position in the retrieved 360-degree graphical representation to identify a position and direction of the host vehicle in the retrieved 360-degree graphical representation corresponding to the current position and the direction of the host vehicle obtained based on processing of the real-time data;

displaying a vehicle travel route planning based on adjusting the viewing angle and the position; and facilitating an autonomous driving of the host vehicle by translating the retrieved 360-degree graphical representation with the identified position and direction of the host vehicle into a driving function.

2. The method of claim 1 comprises the steps of:
wherein the 360-degree graphical representation include 3D views of the roads, generated using graphical and geometric features, and are configured to reflect an actual visual perspective from a vehicle on the road, during a full 360-degree rotation;

embedding within each 360-degree graphical representation, a 3D coordinate system that corresponds to GPS positions on the roads;

integrating data collected by a GPS system on board the vehicle, a forward-facing camera(s) of the road view recording vehicle, and the road view recording vehicle's sensors;

accessing in real-time the 360-degree graphical representations corresponding to the host vehicle's current GPS location, through continuous data transmission between the cloud-based server and the host vehicle's on-board systems;

wherein the host vehicle's position and orientation are aligned with the road network as stored in the 360-degree database.

3. The method of claim 1, wherein retrieving a graphic representation of 360-degree visual scenes experienced from a vehicle on the road comprises:
deploying road view recording vehicle equipped with a set of cameras configured to capture 360-degree visual scenes continuously while the vehicle is in motion along the road network;

equipping the road view recording vehicle with a geolocation unit that precisely determines a geographical position of the road view recording vehicle in real-time as it traverses the road network;

synchronizing the captured 360-degree visual scenes with the corresponding geographical positions by associating each recorded frame of the visual scene with the exact geolocation data obtained from the geolocation unit;

processing the recorded visual scenes to create a 360-degree graphical representation, corresponding to full 360-degree rotation;

wherein each 360-degree graphical representation is indexed and organized according to its associated geographical position, allowing for precise retrieval and use in navigation systems;

verifying and adjusting the geographical data as necessary to maintain consistency between the recorded scenes and the corresponding 360-degree graphical representation.

4. The method of claim 1, wherein the road view recording-vehicle comprises a physical assembly of cameras securely mounted at specific locations and orientations on the vehicle, wherein the cameras are connected to a centralized data processing system within the vehicle, wherein the cameras are activated to capture images that cover a 360-degree field of view at each location, wherein the cameras are positioned at varying heights to capture detailed images of the road surface from different vertical perspectives, wherein data collected by the cameras is transmitted to the onboard processing system, where it is stored and analyzed to create a comprehensive, multi-dimensional representation of the road geometry and its surroundings.

5. The method of claim 1, wherein retrieving a graphical representation of the 360-degree visual scenes experienced from a vehicle on the road further comprises:
driving the road view recording vehicle through the road networks to gather comprehensive visual data;

continuously recording 360-degree video footage and capturing images of the road and surrounding environment;

utilizing an onboard data processing unit to synchronize and compile the collected video footage and images;

creating a detailed, comprehensive 360-degree view of the road networks from the collected data;

converting the compiled data into a 360-degree graphical representation that accurately reflects the visual scenes experienced from the road view recording vehicle.

6. The method of claim 1, wherein retrieving a graphic representation of the 360-degree visual scenes from a vehicle on the road further comprises:
driving the road view recording-vehicle through the road networks to gather comprehensive visual data;

continuously recording 360-degree video footage and capturing high-resolution images of the road and surrounding environment;

utilizing an onboard data processing unit to synchronize and compile the collected video footage and images;

creating a detailed 360-degree view of the road networks from the collected data;

converting the compiled data into a 360-degree graphic representation that accurately reflects the visual scenes experienced from the vehicle;

wherein geometric entities are represented/displayed in an empty space or empty background;

storing the 360-degree graphical representation in a cloud-based facility;

ensuring the 360-degree database is structured to allow efficient storage and retrieval of the 360-degree graphical representation.

7. The method of claim 1, wherein the host vehicle comprises:
a communication unit integrated into the host vehicle, capable of receiving data over a wireless network, wherein the communication unit continuously receives graphic representations of 360-degree visual scenes;

a GPS module installed in the host vehicle to determine the host vehicle's current location, wherein the GPS module continuously provides real-time location data to the communication unit;

wherein the communication unit receives the graphic representations corresponding to the GPS location of the host vehicle;

wherein the communication unit includes a data processing module that synchronizes the received graphic representations with the real-time GPS location data;

the onboard display system in the host vehicle that presents the graphic representations to a driver;

wherein the display system updates in real-time based on the vehicle's current GPS location.

8. The method of claim 1, wherein the host vehicle cameras further comprises:
multiple cameras mounted at strategic points around the host vehicle;

wherein the cameras are oriented in different directions, including forward-facing camera mounted on the front of the host vehicle, side-view cameras mounted on the left and right sides, and rear-view cameras positioned at the back of the vehicle;

wherein each camera continuously gathers video footage of the actual scenes around the vehicle ensuring coverage of the surroundings;

wherein the host vehicle is equipped with a data processing unit.

9. The method of claim 1 further comprising:

processing the video footage captured by the host vehicle-mounted cameras using a computer implemented algorithm to identify reference features, including road limits, road markings, and road lanes, wherein the processing step involves applying computer vision techniques to analyze the video footage and detect the reference features;

determining the exact location and direction of the host vehicle at the known GPS location by comparing the identified reference features against a 360-degree graphic representation;

wherein the location and direction of the host vehicle are calculated using spatial analysis algorithms that match the identified reference features with the corresponding elements in the 360-degree graphic representation;

utilizing the matched location and direction data to update the host vehicle's navigation system in real-time, ensuring precise positioning and orientation.

10. The method of claim 1 further comprising:

collecting video footage and sensor data from the host vehicle's mounted cameras and external sensors, including radar, and ultrasonic sensors, wherein the external sensors and cameras are strategically placed to provide coverage of the vehicle's surroundings;

processing the collected video footage and sensor data using a computer-implemented algorithm to detect and identify the presence of other vehicles and objects around the host vehicle;

measuring the relative location, relative speed, and relative acceleration between the host vehicle and other vehicles or objects in the vicinity, wherein the relative location is determined using distance measurements obtained from the external sensors.

11. The method of claim 1 further comprising:

collective video footage and sensor data from the host vehicle's mounted cameras and external sensors, including radar and ultrasonic sensors, wherein the sensors and cameras are strategically placed to provide coverage of the host vehicle's surroundings;

processing the collected video footage and sensor data using a computer-implemented algorithm to detect and identify the presence of other vehicles and objects around the host vehicle;

measuring the relative location, relative speed, and relative acceleration between the host vehicle and other vehicles or objects in the vicinity, wherein the relative location is determined using distance measurements obtained from the sensors;

determining the exact location of the identified vehicles and objects by comparing the processed data against the 360-degree graphical representation.

12. The method of claim 1 further comprising:

collecting data from the host vehicle's mounted cameras and external sensors to gather real-time environmental information;

analyzing the collected data to identify key environmental features, including road limits, road markings, road lanes, obstacles, and other vehicles, wherein the analysis is performed using image recognition and pattern matching techniques to accurately identify and map these features;

determining the exact location of the identified vehicles and objects by comparing the processed data against the 360-degree graphical representation;

converting the processed data into autonomous travel instructions;

utilizing the processed data to update the host vehicle's navigation and driver-assistance systems in real-time;

continuously updating the autonomous travel instructions based on new data from the sensors and cameras to adapt to changing environmental conditions;

wherein the system dynamically adjusts the travel instructions to account for real-time changes in the host vehicle's surroundings, ensuring continuous and accurate autonomous operation.

13. The method of claim 1, further comprising:

mounting a display unit in the host vehicle to provide real-time visual feedback to the driver;

wherein the display unit is securely installed in a position that is easily visible to the driver, such as the host vehicle's dashboard;

collecting data from the host vehicle's mounted cameras and external sensors to gather real-time environmental information;

analyzing the collected data to identify key environmental features using image recognition and pattern matching techniques to accurately identify and map these features;

determining the exact location of the identified vehicles and objects by comparing the processed data against the 360-degree graphical representation;

accessing an adjusted pre-defined representation of the view recorded by the forward-facing camera;

wherein the retrieved 360-degree graphical representation incorporates the identified vehicles and objects, accurately reflecting their positions relative to the host vehicle;

displaying the retrieved 360-degree graphical representation on the display unit in real-time;

wherein the displaying provides a visual illustration that includes the exact locations of the identified vehicles and objects in the adjusted pre-defined representation;

continuously updating the display as new data is processed, ensuring that the driver receives up-to-date information about the vehicle's surroundings;

wherein the system dynamically refreshes the displayed information to account for real-time changes and movements of the identified vehicles and objects.

* * * * *